J. H. Buckman,

Shaft Coupling.

No. 98,144. Patented Dec. 21, 1869.

Attest.
Charles Pickles
F. R. Lord

Inventor.
John H. Buckman
By Frank Millward
Attorney

United States Patent Office.

JOHN H. BUCKMAN, OF CINCINNATI, OHIO, ASSIGNOR TO HIMSELF AND PETER W. REINSHAGEN, OF SAME PLACE.

Letters Patent No. 98,144, dated December 21, 1869.

IMPROVED DEVICE FOR SECURING PULLEYS TO SHAFTS.

The Schedule referred to in these Letters Patent and making part of the same.

*To all whom it may concern:*

Be it known that I, JOHN H. BUCKMAN, of Cincinnati, Hamilton county, State of Ohio, have invented certain new and useful Improvements in Devices for Securing Pulleys, Gear-Wheels, &c., to Shafts; and I do hereby declare the following to be a sufficiently full, clear, and exact description thereof to enable one skilled in the art to which my invention appertains, to make and use it, reference being had to the accompanying drawings, making part of this specification.

My invention has for its object the production of a fastening-device, applicable alike to both hollow and solid shafting, and one that shall secure the hub of the pulley or wheel to the shaft, in such a manner that the pulley or wheel shall not, by the act of fastening, be forced out of its required concentric position on the shaft, and one that shall cause the "hub" to hug the shaft equally in all directions; and My invention consists in constructing the hub of the wheel or pulley of a "crowning" or double cone-shape, to which two rings, bored to match, are fitted, the hub on each side being slotted, or severed at two or more points, in order that the rings, when driven on to the cones, will serve to contract the bore of the hub, and compel it to hug the shaft.

In the accompanying drawings—

Figure 1:
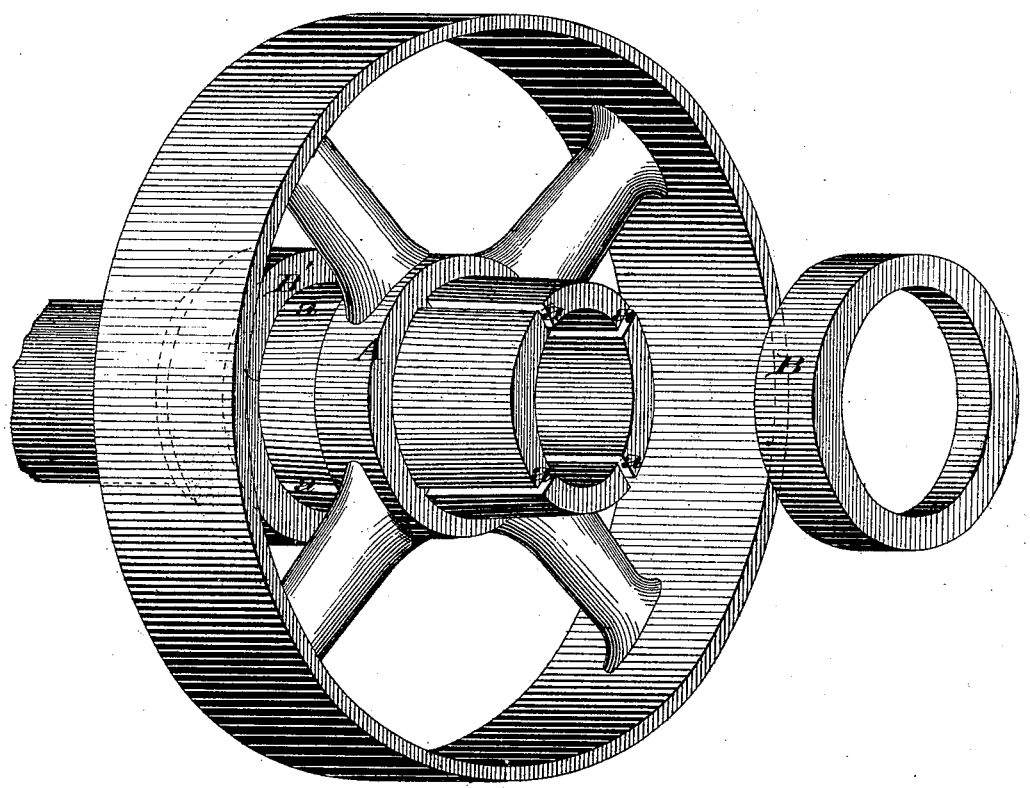
Figure 1 is a perspective view of a pulley embodying my invention, one of the rings being detached.
Figure 2:
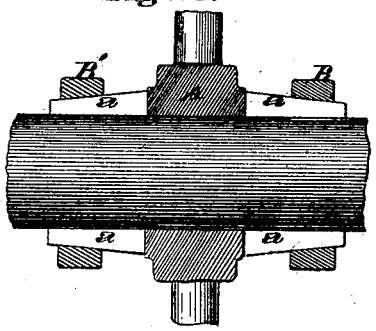
Figure 2 is an axial section, with both rings in place.

The hub A is turned on the outside, tapering from both ends alike, in the manner as shown, and is fitted with rings B B', which are bored tapering to match the hub.

The hub A, at each end, from the extreme end to points near the arms, is split, severed, or slotted entirely through at two or more points $a$, as shown, for the purpose of rendering the hub elastic, and enabling it to be closed or contracted in size, by the driving on of the rings B B'.

It will be seen that the simple act of driving on the rings B B' serves to force the hub tightly in all directions alike to the shaft, and preserves the concentricity of the pulley or wheel.

It is well known, that in the use of the common taper-key or the set-screw for securing pulleys, &c., to shafts, that the inside of the hub, when fastened, has but two points of bearing on the shaft, and those mere line bearings, and that neither the key nor set-screw is admissible for hollow shafts, in consequence of their liability to indent or collapse the shaft.

The key or set-screw also forces the pulley or wheel "out of true," even when a good fit, so that when these fastenings are used, the inconvenient "driving-fits" are essential.

With my device for attachment of the pulley to the shaft, the hubs may be bored a loose fit, convenient to adjust and remove, and yet, when fastened, be always concentric to the shaft.

The device is applicable to either hollow or solid shafting.

I claim herein as new, and of my invention—

The tapering hub A, provided with slots $a$, in combination with the tightening-rings B B', operating in the manner and for the purpose specified.

In testimony of which invention, I hereunto set my hand.

J. H. BUCKMAN.

Witnesses:
JEROME DU BOIS,
JOHN F. GLEICK.